United States Patent [19]

Altermatt

[11] 3,956,268
[45] May 11, 1976

[54] SUBSTITUTED PHENYL-AZO-PHENYLENE-AZO-PHENYL DYES

[75] Inventor: Ruedi Altermatt, Buckten, Switzerland

[73] Assignee: Sandoz Ltd., Basel, Switzerland

[22] Filed: June 12, 1972

[21] Appl. No.: 262,066

[30] Foreign Application Priority Data

June 17, 1971 Switzerland.................. 8819/71

[52] U.S. Cl............................... 260/187; 260/156; 260/174; 260/186; 260/205; 260/206; 260/207; 260/207.1
[51] Int. Cl.² ............... C07C 31/04; C07C 31/08; C07C 31/14; C07C 43/18
[58] Field of Search ........... 260/174, 177, 184, 186, 260/187

[56] References Cited
UNITED STATES PATENTS

| | | | |
|---|---|---|---|
| 3,445,454 | 5/1969 | Fishwick | 260/186 X |
| 3,522,234 | 7/1970 | Groebke | 260/207 |
| 3,523,936 | 8/1970 | Toji | 260/187 |
| 3,661,888 | 5/1972 | Sagal | 260/187 |
| 3,712,882 | 1/1973 | Blackwell | 260/184 X |

FOREIGN PATENTS OR APPLICATIONS

7,008,951  12/1970  Netherlands................... 260/207.1

Primary Examiner—Charles F. Warren
Attorney, Agent, or Firm—Gerald D. Sharkin; Richard E. Vila; Melvyn M. Kassenoff

[57] ABSTRACT

This invention provides novel disperse dyes of formula I,

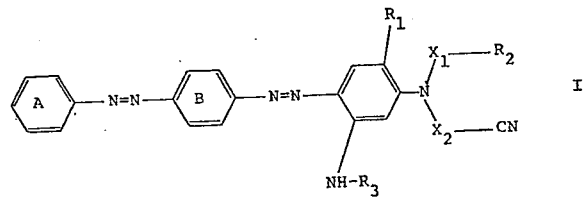

in which $R_1$ signifies hydrogen, cyano, alkyl or alkoxy,
$R_2$ signifies unsubstituted alkylcarbonyloxy; alkylcarbonyloxy substituted by halogen, alkoxy, alkylcarbonyl, aryl or phenoxy; unsubstituted benzoyloxy, benzoyloxy substituted by one or more substituents selected from halogen, alkyl and nitro; unsubstituted alkoxycarbonyloxy; alkoxycarbonyloxy substituted by halogen, or phenyl; phenoxycarbonyloxy; 2-pyridyl or 4-pyridyl,
$R_3$ signifies formyl, unsubstituted alkylcarbonyl; alkylcarbonyl substituted by halogen, cyano, alkoxy, alkylcarbonyl, aryl or aryloxy; benzoyl; benzoyl substituted by one or more substituents selected from halogen, nitro and alkyl; unsubstituted alkoxycarbonyl; alkoxycarbonyl substituted by halogen, aryl or alkoxy; phenoxycarbonyl; unsubstituted alkylsulphonyl; unsubstituted phenylsulphonyl or phenylsulphonyl substituted by alkyl,
rings A and B may be substituted,
and $X_1$ and $X_2$, which may be the same or different, each signifies an alkylene radical of 1 to 6 carbon atoms,
provided that the compounds contain no sulphonic acid groups.

These dyes are useful for dyeing higher molecular weight, hydrophobic fibers, such as linear aromatic polyesters, synthetic polyamides, secondary cellulose acetate and cellulose triacetate on which they build up well and exhibit good fastness to light, thermofixation, sublimation, pleating, washing, perspiration, dry cleaning, lubricants, rubbing, cross dyeings, ozone, gas fumes and chlorine.

25 Claims, No Drawings

SUBSTITUTED PHENYL-AZO-PHENYLENE-AZO-PHENYL DYES

IMPROVEMENTS IN OR RELATING TO ORGANIC COMPOUNDS

This invention relates to disazo compounds useful as disperse dyes for dyeing and printing synthetic and semisynthetic, high molecular weight fibres of hydrophobic character, in loose form, as yarn and in other textile forms.

More particularly, this invention provides compounds of formula I,

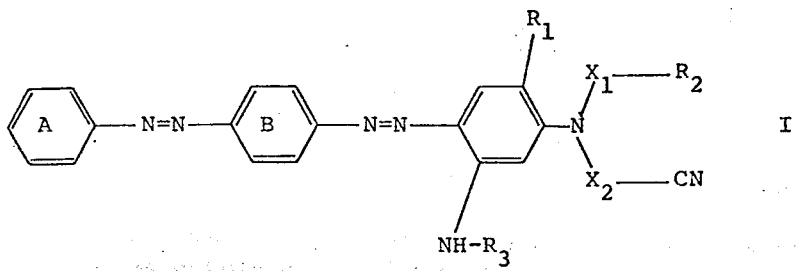

in which $R_1$ signifies hydrogen, alkyl or alkoxy, $R_2$ signifies unsubstituted alkylcarbonyloxy; alkycarbonyloxy substituted by halogen cyano, alkoxy, alkylcarbonyl, aryl or phenoxy; unsubstituted benzoyloxy; benzoyloxy substituted by one or more substituents selected from halogen, alkyl and nitro; unsubstituted alkoxycarbonyloxy; alkoxycarbonyloxy substituted by halogen, or phenyl; phenoxycarbonyloxy; 2-pyridyl or 4-pyridyl, $R_3$ signifies formyl, unsubstituted alkylcarbonyl; alkylcarbonyl substituted by halogen, cyano, alkoxy, alkylcarbonyl, aryl or aryloxy; benzoyl; benzoyl substituted by one or more substituents selected from halogen, nitro and alkyl; unsubstituted alkoxycarbonyl; alkoxycarbonyl substituted by halogen, aryl or alkoxy; phenoxycarbonyl; unsubstituted alkylsulphonyl; unsubstituted phenylsulphonyl or phenylsulphonyl substituted by alkyl, rings A and B may be substituted, and $X_1$ and $X_2$, which may be the same of different, each signifies a alkylene radical of 1 to 6 carbon atoms, provided that the compounds contain no sulphonic acid groups.

As used herein, the terms "alkyl" and "alkoxy" mean, respectively, alkyl and alkoxy radicals of 1 to 6, preferably 1 to 4 carbon atoms. This invention also extends to compounds having a cycloalkyl or cycloalkyloxy, e.g., cyclohexyl or cyclohexloxy, radical in lieu of an alkyl or alkoxy radical.

The term "halogen" means chlorine or bromine, and "aryl" preferably signifies phenyl.

$X_1$ and $X_2$ preferably signify radicals of formula

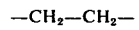

or

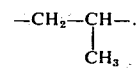

Suitable substituents on rings A and B include halogen, hydroxy, nitro, cyano, thiocyano, methylsulphonyl, alkyl, alkoxy, alkylcarbonyl and alkoxycarbonyl.

The preferred compounds of formula I are those of formula Ia,

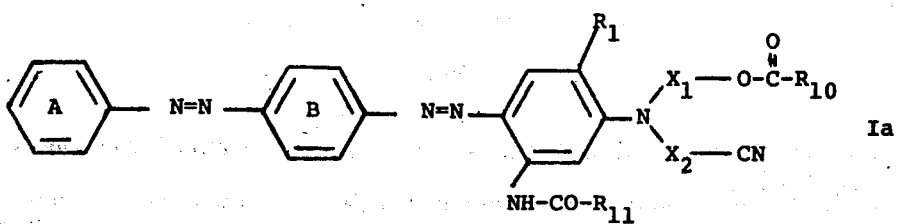

in which $R_1$, $X_1$, $X_2$ and rings A and B are as defined above, $R_{10}$ signifies unsubstituted alkyl; alkyl substituted by halogen, cyano, acetyl, alkoxy, phenyl or phenoxy; unsubstituted alkoxy; alkoxy substituted by halogen or phenyl; unsubstituted phenyl or phenyl substituted by one or more substituents selected from halogen, alkyl and nitro, and $R_{11}$ signifies hydrogen; unsubstituted alkyl; alkyl substituted by halogen, cyano, acetyl, alkoxy or phenyl; unsubstituted alkoxy; alkoxy substituted by halogen or phenyl; phenyl or phenoxy, provided that the compounds contain no sulphonic acid groups.

The invention also provides processes for the production of compounds of formula I, characterised by
a. coupling a diazonium derivative of a compound of formula II,

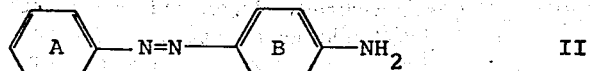

in which rings A and B are as defined above, with a compound of formula III,

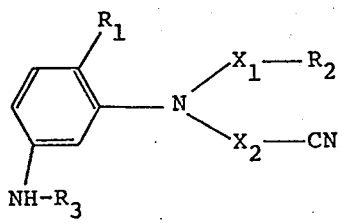

in which $R_1$, $R_2$, $R_3$, $X_1$ and $X_2$ are as defined above,
or
b. producing a compound of formula Ib,

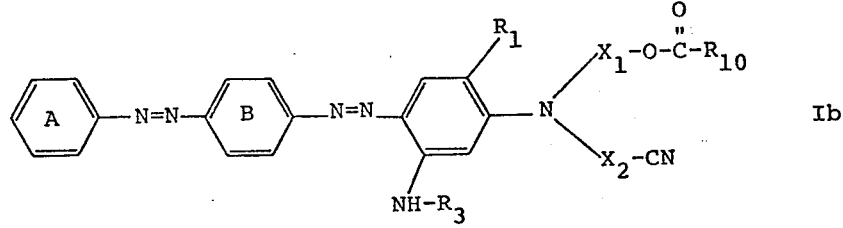

in which $R_1$, $R_3$, $R_{10}$, $X_1$, $X_2$ and rings A and B are as defined above,
by condensing a compound of formula IV,

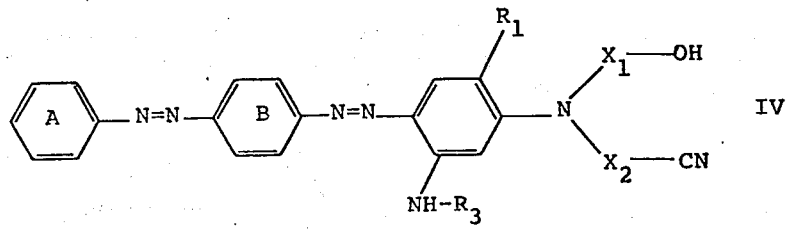

in which $R_1$, $R_3$, $X_1$, $X_2$ and rings A and B are as defined above,
with a functional derivative of an acid of formula V, $$R_{10} - COOH \qquad V$$

in which $R_{10}$ is as defined above.

In process a, the coupling reaction may be effected in conventional manner, for example, in an acid medium which may, if necessary, be buffered, for example in the pH region below 5. Suitable buffer agents include alkali metal salts of lower alkanoic acids, e.g. acetic and propionic acids, preferably sodium acetate. The process is conveniently effected at a temperature of below 20°C, preferably −5° to +5°C.

In process b, suitable functional derivatives of the acid of formula V include acid anhydrides, chlorides and bromides and chloroformic acid esters. The process is suitably carried out in an inert organic solvent. The temperature at which the process is preferably effected and the solvent preferably employed depend on the particular functional derivative of the compound V which is employed. Thus, for example, when an acid anhydride is employed, a temperature of from 20° to 150°C is conveniently adopted and solvents such as a chlorobenzene, benzene, toluene, xylene, dioxane or mixtures thereof, or the carboxylic acid corresponding to the acid anhydride, may suitably be used. Alternatively, an excess of the acid anhydride may conveniently be used to provide a reaction medium. When, on the other hand, a chloroformic acid ester or acid halide is employed as the functional derivative of the compound of formula V, the process may conveniently be effected at a temperature of from 0° to 100°C and in a inert solvent, such as a chlorobenzene, benzene, toluene, or acetone. The process is conveniently effected in the presence of an acid-binding agent e.g. magnesium oxide or a tertiary nitrogen base, such as pyridine. Alternatively, a nitrogenous base, such as pyridine, in which the compound of formula IV is soluble, may be used as solvent and acid binding agent.

The resulting compounds of formula I may be isolated and purified using conventional techniques.

The diazonium derivatives of the compounds of formula II, employed as starting materials in process a, may be produced in conventional manner. The compounds of formula II and III are either known or may be produced in conventional manner from available materials.

The compounds of formula IV, employed as starting materials in process b, may be produced in conventional manner, for example in analogous manner to process a, described above.

The compounds of formula V, employed as starting materials in process b, are either known or may be produced in conventional manner from available materials.

The compounds of formula I may be worked up into dyeing preparations prior to use in conventional manner, for example by grinding in the presence of dispersing agents and/or fillers, followed by vacuum or atomiser drying if dry products are required. After addition of a suitable quantity of water, the preparations may suitably be applied by exhaust dyeing, pad dyeing or printing methods at long to short liquor ratios.

From aqueous dispersions, the compounds of formula I build up well on textile substrates comprising synthetic or semi-synthetic organic fibres of high molecular weight and hydrophobic character, for example linear aromatic polyester, synthetic polyamide, secondary cellulose acetate and cellulose triacetate fibres.

Known dyeing and printing methods may be employed (for example the method described in French Patent 1,445,371).

The dyeings obtained show good fastness, particularly to light, thermofixation, sublimation and pleating. They are also fast to wet treatments, such as water, sea water, washing, perspiration, solvents and dry cleanings, and to lubricants, rubbing, cross dyeings, ozone, gas fumes and chlorine. The dyeings are also stable to the conditions of the pre-cure and post-cure permanent press finishing processes and to soil release finishes. Their dischargeability, resistance to reducing action in dyeing with wool and reserve of wool and cotton are also noteworthy.

The following Examples, in which parts and percentages are by weight and temperatures are in degrees centigrade, illustrate the invention.

EXAMPLE 1

A solution of 19.7 parts of 4-amino-1,1'-azobenzene in 250 parts of glacial acetic acid, is poured rapidly with vigourous stirring into a mixture of 25 parts of concentrated hydrochloric acid and 150 parts of ice. The diazo component is then present in very fine form, and in the course of 2 hours it is diazotised at 0°–5° with a solution of 6.9 parts of sodium nitrite in 25 parts of water. Stirring is continued for a further hour at 0°–5°, and excess sodium nitrite is then decomposed by addition of amidosulphonic acid. The diazonium salt solution is clarified by filtration and combined with a mixture of 30 parts of glacial acetic acid, and 28.9 parts of 1-(N-cyanoethyl-N-acetoxyethyl)-amino-3-acetylaminobenzene at 0°–5°. Formation of the dye sets in immediately and after one hour is complete. The precipitated dye of formula

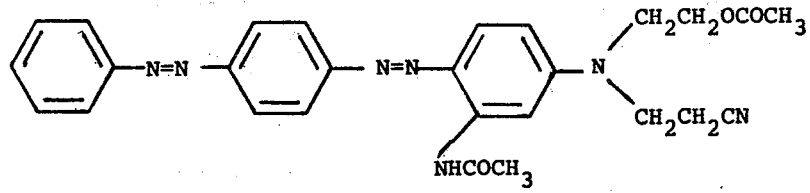

is isolated by filtration, washed with water until free of acid and dried. It dyes polyester fibres in brilliant scarlet shades which show excellent all-round fastness.

EXAMPLE 2

45.5 Parts of the compound of formula

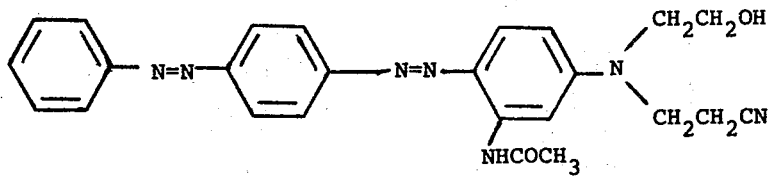

and 50 parts of acetic anhydride are reacted at 100° with stirring. When no further starting material is detected by thin-layer chromatography, which normally occurs after 15–30 minutes the reaction mixture is slowly diluted with 250 parts of hot water, which causes precipitation of the acetylated product. It is filtered, washed with water and dried. The resulting dye, which thin-layer chromatography and dyeing behaviour tests show to be identical with the dye of Example 1, is obtained in a yield of 49.7 parts.

The following Table 1 indicates further dyes of formula

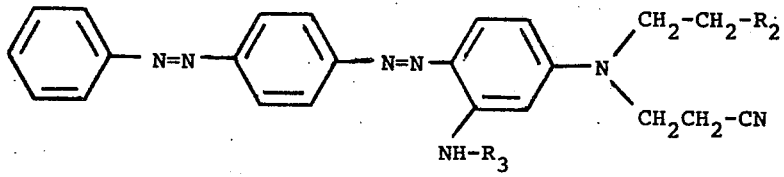

in which $R_2$ and $R_3$ are as defined in the table, which are produced in accordance with the preceding Examples. These dyes all give dyeings of scarlet shade on polyester textiles.

Table 1

| Example No. | $R_2$ | $R_3$ |
|---|---|---|
| 3 | —OCOCH₃ | —CO—CH₂CH₃ |
| 4 | do. | —CO—CH₂CH₂Cl |
| 5 | —OCOCH₂CH₃ | —CO—CH₃ |
| 6 | do. | —COO—CH₃ |
| 7 | —OCOCH₃ | do. |
| 8 | —OCOC₆H₅ | do. |
| 9 | —OCOCH₂C₆H₅ | —COO—CH₂CH₃ |
| 10 | —OCOCH₃ | —COOCH₂CH₃ |
| 11 | do. | —CO—C₆H₅ |
| 12 | —OCOOCH₃ | —CO—CH₃ |
| 13 | —OCOOCH₂C₆H₅ | do. |
| 14 | —OCOOC₆H₅ | do. |
| 15 | —OCOOCH₂CH₃ | do. |
| 16 | —OCOOCH₃ | —CO—C₆H₅ |
| 17 | —OCOCH₂OCH₃ | —CO—CH₂—O—CH₃ |
| 18 | —OCOCH₂OCH₃ | —CO—CH₃ |
| 19 | —OCOOCH₃ | —COCH₂CH₂OCH₃ |
| 20 | —OCOOCH₂CH₃ | do. |
| 21 | —OCOCH₂CH₃ | —COCHCH₂—Cl<br>                Cl |

Table 1-continued

| Example No. | R₂ | R₃ |
|---|---|---|
| 22 | —OCOC₆H₅ | do. |
| 23 | —OCOOCH₃ | —COO—CH₃ |
| 24 | do. | —COO—CH₂CH₃ |
| 25 | do. | —COOCH₂C₆H₅ |
| 26 | —OCO—CH₃ | do. |
| 27 | do. | —COCHCH₃<br>\|<br>Cl |
| 28 | do. | —COOCH₂CH₂OCH₃ |
| 29 | do. | —COCH₂—C₆H₅ |
| 30 | ⟨pyridyl⟩ | —COCH₃ |
| 31 | ⟨pyridyl⟩ | —COCH₂CH₃ |
| 32 | —OCO—⟨C₆H₄⟩—Cl | —COCH₃ |
| 33 | —OCOCH₃ | —CHO |
| 34 | —OCOCH₃ | —COOCH(CH₃)₂ |
| 35 | do. | —COOH₂CH₂Br |
| 36 | do. | —COCH₂OC₆H₅ |
| 37 | —OCOCH₂Cl | —COCH₂Cl |
| 38 | —OCOCH₃ | —COCH₂CN |
| 39 | —OCO—⟨C₆H₄⟩—NO | —COCH₃ |
| 40 | —OCOCH₃ | —COCH₂COCH₃ |
| 41 | —OCOCH₂COCH₃ | —COCH₃ |
| 42 | —OCOCH₃ | —COOCH₂CH₂Cl |
| 43 | —OCOCH₂CH₂CH₃ | —COCH₃ |
| 44 | —OCOCHCH₃<br>\|<br>CH₃ | do. |
| 45 | —OCOCH₃ | —COOCH(CH₃)₂ |
| 46 | —OCOCH₃ | —SO₂CH₃ |
| 47 | do. | —SO₂—C₆H₅ |
| 48 | do. | —SO₂—⟨C₆H₄⟩—CH₃ |
| 49 | —OCOCH₂—O—C₆H₅ | —COCH₃ |
| 50 | —O—CO—O—CH₂CH₂Cl | —COCH₃ |
| 51 | —O—CO—⟨C₆H₄⟩—Br | do. |
| 52 | —O—COCH₂Br | do. |
| 53 | —O—CO—⟨C₆H₄⟩—CH₃ | do. |
| 54 | —O—COOCH₂CH₂Br | do. |
| 55 | —OCOCH₃ | —CO—⟨C₆H₄⟩—NO₂ |
| 56 | do. | —CO—⟨C₆H₄⟩—Cl |
| 57 | do. | —CO—⟨C₆H₄⟩—Br |
| 58 | do. | —CO—⟨C₆H₄⟩—CH₃ |
| 59 | do. | —COOCH₂CH₂Br |
| 60 | do. | —COOC₆H₅ |

The following table 2 indicates dyes of formula

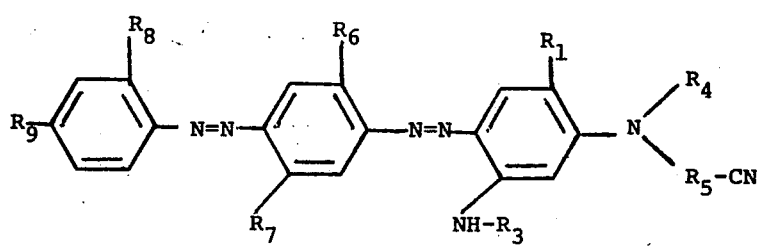

in which $R_1$, $R_3$, $R_4$, $R_5$, $R_6$, $R_7$, $R_8$ and $R_9$ are as defined in the table, which are produced in accordance with the preceding Examples.

Table 2

| Ex. No. | $R_1$ | $R_3$ | $R_4$ | $R_5$ | $R_6$ | $R_7$ | $R_8$ | $R_9$ | Shade on polyester fiber |
|---|---|---|---|---|---|---|---|---|---|
| 61 | $-OCH_3$ | $-CO-CH_3$ | $-CH_2CH_2OCOCH_3$ | $-CH_2CH_2-$ | H | H | H | H | reddish violet |
| 62 | do. | $-COO-CH_3$ | do. | do. | H | H | H | H | do. |
| 63 | $-CH_3$ | $-CO-CH_3$ | do. | do. | H | H | H | H | do. |
| 64 | H | do. | do. | do. | $-OCH_3$ | $-OCH_3$ | H | H | do. |
| 65 | H | do. | do. | do. | do. | $-CH_3$ | H | H | red |
| 66 | H | do. | do. | $-CH_2-CH-CH_3$ | H | H | H | H | scarlet |
| 67 | H | do. | do. | $-CH_2CH_2-$ | H | H | $-Cl$ | $-NO_2$ | violet |
| 68 | H | $-COO-CH_3$ | do. | do. | H | H | H | $-NO_2$ | do. |
| 69 | H | $-CO-CH_3$ | $-CH_2CH_2OCOOCH_3$ | $-CH_2CH_2-$ | H | H | H | $-SO_2CH_3$ | ruby |
| 70 | H | do. | $-CH_2-CH_2OCOOCH_2CH_2Cl$ | do. | H | $-CH_3$ | H | H | scarlet |
| 71 | H | do. | $-CH_2CH_2OCOCH_3$ | do. | H | $-CH_3$ | H | $-OCH_3$ | do. |
| 72 | H | $-CO-CH_2CH_3$ | do. | do. | H | H | H | Br | do. |
| 73 | H | $-CO-CH_3$ | $-CH_2-CH-OCOCH_3$ $\quad$ $CH_3$ | do. | H | H | H | H | do. |
| 74 | H | $-CO-CH_2CH_3$ | do. | do. | H | H | H | H | do. |
| 75 | H | $-CO-CH_3$ | $-CH_2CH_2OCOCH_3$ | do. | $-OCH_3$ | H | H | H | orange |
| 76 | H | do. | do. | do. | $-Cl$ | H | H | H | do. |
| 77 | H | do. | do. | do. | H | $-CH_3$ | H | H | scarlet |
| 78 | H | do. | do. | do. | H | $-CH_3$ | H | $-NO_2$ | reddish violet |
| 79 | H | do. | do. | do. | H | H | H | $-NO_2$ | ruby |
| 80 | H | $-CO-CH_3$ | $-CH_2CH_2OCOCH_3$ | $-CH_2CH_2-$ | H | H | H | Cl | scarlet |
| 81 | H | do. | do. | do. | H | $CH_3$ | H | Cl | do. |
| 82 | H | do. | do. | do. | $-OCH_3$ | $-CH_3$ | H | $-NO_2$ | violet |
| 83 | H | do. | do. | do. | H | H | Cl | $-SO_2CH_3$ | reddish violet |
| 84 | H | do. | do. | do. | $-OCH_3$ | $-OCH_3$ | H | $-NO_2$ | reddish blue |
| 85 | H | $-COO-\langle H \rangle$ | do. | do. | do. | do. | H | do. | do. |
| 86 | H | $-COCH_3$ | $-CH_2CH_2OCOCH_3$ | do. | H | H | H | $-CH_3$ | scarlet |
| 87 | H | do. | do. | do. | H | H | H | $-OCH_3$ | do. |
| 88 | H | do. | do. | do. | H | H | H | $-SO_2CH_3$ | ruby |
| 89 | H | do. | $-CH_2CH_2OCOOCH_3$ | do. | H | H | H | $-Cl$ | scarlet |
| 90 | H | do. | $-CH_2CH_2OCOOCH_2CH_3$ | do. | H | H | H | $-Cl$ | do. |
| 91 | H | $-COCH_3$ | $-CH_2CH_2OCOCH_3$ | $-CH_2CH_2-$ | H | H | H | $-Br$ | scarlet |
| 92 | H | do. | do. | do. | H | $-CH_3$ | H | $-CH_3$ | do. |
| 93 | H | do. | do. | do. | H | do. | H | $-OCH_2CH_3$ | do. |
| 94 | H | do. | do. | do. | H | H | H | do. | do. |
| 95 | $-OCH_3$ | do. | $-CH_2CH_2OCOCH_3$ | do. | $-OCH_3$ | $-OCH_3$ | H | $-NO_2$ | blue |
| 96 | H | do. | do. | do. | do. | H | H | $-NO_2$ | brown |
| 97 | H | do. | $-CH_2CH_2-\langle N \rangle$ | do. | H | H | H | $-OCH_3$ | scarlet |
| 98 | $-OC_2H_5$ | do. | $-CH_2CH_2OCOCH_3$ | do. | H | H | H | H | reddish violet |
| 99 | $-OCH_3$ | do. | $-CH_2-CH_2OCOOCH_3$ | do. | $-OCH_3$ | $-OCH_3$ | H | $-NO_2$ | blue |
| 100 | H | do. | $-CH_2CH_2-\langle N \rangle$ | do. | H | H | H | $-OCH_3$ | scarlet |
| 101 | H | do. | $-CH_2CH_2OCOCH_3$ | do. | H | H | H | $-CN$ | reddish violet |
| 102 | H | $-COCH_3$ | $-CH_2CH_2OCOCH_3$ | $-CH_2CH_2-$ | H | H | H | $-S-C=N$ | red |
| 103 | H | do. | do. | do. | H | H | H | $-COOCH_3$ | do. |
| 104 | H | do. | do. | do. | H | H | H | $-OH$ | scarlet |
| 105 | H | do. | $-CH_2-CH-OCOOCH_3$ $\quad$ $CH_3$ | do. | H | $CH_3$ | H | H | do. |
| 106 | H | do. | $-CH_2CH_2OCOCH_2CH_3$ | do. | H | H | H | $-OCH_3$ | do. |
| 107 | H | $-COCH_2CH_3$ | $-CH_2CH_2OCOCH_3$ | do. | H | H | H | do. | do. |
| 108 | H | do. | do. | do. | H | $-CH_3$ | H | do. | do. |
| 109 | H | do. | do. | do. | H | do. | H | Cl | do. |
| 110 | H | do. | do. | do. | H | H | H | Cl | do. |
| 111 | H | $-COOCH_3$ | do. | do. | H | H | H | Cl | do. |
| 112 | H | do. | do. | do. | H | $-CH_3$ | H | Cl | do. |
| 113 | H | do. | do. | do. | H | do. | H | $-OCH_3$ | do. |
| 114 | H | $-COOCH_2CH_3$ | $-CH_2CH_2OCOCH_3$ | $-CH_2CH_2-$ | H | $-CH_3$ | H | $-OCH_3$ | scarlet |
| 115 | H | do. | do. | do. | $-OCH_3$ | do. | H | H | red |
| 116 | H | $-CO-CH_2CH_3$ | do. | do. | do. | do. | H | H | do. |
| 117 | H | $-CO-CH_3$ | $-CH_2CH_2OCOCH_2CH_3$ | do. | do. | do. | H | H | do. |
| 118 | H | $-COOCH_3$ | do. | do. | do. | do. | H | H | do. |
| 119 | H | do. | $-CH_2CH_2OCOCH_3$ | do. | do. | do. | H | H | do. |
| 120 | H | do. | $-CH_2CH_2OCOOCH_3$ | do. | do. | do. | H | H | do. |
| 121 | H | do. | do. | do. | do. | do. | H | $-OCH_3$ | do. |
| 122 | H | do. | do. | do. | do. | do. | H | do. | scarlet |
| 123 | H | do. | $-CO-CH_2CH_2OCH_3$ | $-CH_2CH_2OCOCH_3$ | do. | H | H | H | do. |
| 124 | H | $-CO-CH_2CH_2OCH_3$ | $-CH_2CH_2OCOCH_3$ | do. | H | H | H | do. | do. |
| 125 | H | do. | do. | do. | H | $-CH_3$ | H | Cl | do. |
| 126 | H | $-CO-CH_3$ | $-CH_2CH_2OCOCH_2OC_6H_5$ | do. | H | do. | H | H | do. |
| 127 | H | do. | $-CH_2CH_2OCOCH_3$ | do. | H | H | H | $-COCH_3$ | do. |
| 128 | H | do. | do. | do. | H | Cl | H | Cl | do. |

Example of Application

A mixture of 7 parts of the dye produced in Example 1, 4 parts of sodium dinaphthylmethane disulphonate, 4 parts of sodium acetyl sulphate and 5 parts of anhydrous sodium sulphate is ground in a ball mill for 48 hours to give a fine powder. One part of the powder is dispersed in a little water and the dispersion run through a sieve into a bath of 4000 parts of water containing 2 parts of sodium lauryl sulphate.

At 40°–50°, 100 parts of a scoured polyester fabric are entered into the bath (liquor to goods ratio 40:1), 20 parts of a chlorinated benzene emulsified in water then being added and the bath temperature being raised slowly to 95°–100°. Dyeing is continued for 1–2 hours at this temperature until the fabric is on shade. It is then removed, rinsed, soaped, rinsed again and dried. A level, brilliant scarlet dyeing of good depth is obtained which is fast to light, cross dyeing, washing, water, sea water, perspiration, sublimation, gas fumes, thermofixation, pleating and permanent press finishing.

What is claimed is:

1. A compound of the formula

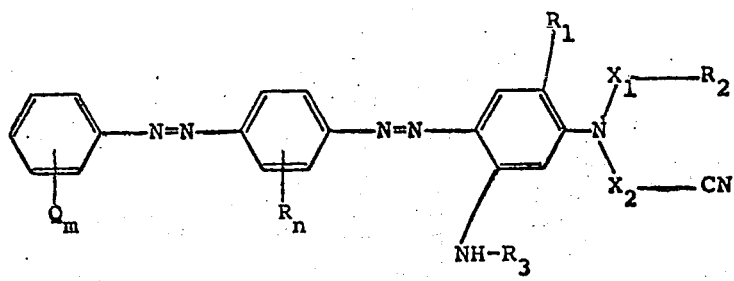

wherein each Q is independently halo, hydroxy, nitro, cyano, thiocyano, methylsulfonyl, alkyl, alkoxy, alkylcarbonyl or alkoxycarbonyl,
  each R is independently halo, hydroxy, nitro, cyano, thiocyano, methylsulfonyl, alkyl, alkoxy, alkylcarbonyl or alkoxycarbonyl,
  $R_1$ is hydrogen, alkyl or alkoxy,
  $R_2$ is alkylcarbonyloxy, alkylcarbonyloxy monosubstituted by halo, cyano, acetyl, alkoxy, phenyl or phenoxy, alkoxycarbonyloxy, alkoxycarbonyloxy monosubstituted by halo or phenyl, benzoyloxy or benzoyloxy monosubstituted by halo, alkyl or nitro,
  $R_3$ is formyl, alkylcarbonyl, alkylcarbonyl monosubstituted by halo, cyano, acetyl, alkoxy or phenyl, dihaloalkylcarbonyl, alkoxycarbonyl, alkoxycarbonyl monosubstituted by halo or phenyl, benzoyl or phenoxycarbonyl,
  each of $X_1$ and $X_2$ is independently straight or branched chain alkylene of 1 to 6 carbon atoms,
  $m$ is 0, 1 or 2, and $n$ is 0, 1 or 2,
wherein each halo is independently chloro or bromo, and
  each alkyl, alkoxy, alkyl chain of alkylcarbonyl, dihaloalkylcarbonyl and alkylcarbonyloxy and alkoxy chain of alkoxycarbonyl and alkoxycarbonyloxy independently has 1 to 6 carbon atoms.

2. A compound according to claim 1 wherein each Q is independently halo, nitro, cyano, thiocyano, methylsulfonyl, alkyl, alkoxy, alkylcarbonyl or alkoxycarbonyl, and
  each R is independently halo, nitro, cyano, thiocyano, methylsulfonyl, alkyl, alkoxy, alkylcarbonyl or alkoxycarbonyl,
wherein each alkyl, alkoxy, alkyl chain of alkylcarbonyl, dihaloalkylcarbonyl and alkylcarbonyloxy and alkoxy chain of alkoxycarbonyl and alkoxycarbonyloxy independently has 1 to 4 carbon atoms.

3. A compound according to claim 2 wherein each of $X_1$ and $X_2$ is independently $$-CH_2CH_2-$$

or

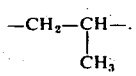

4. A compound according to claim 1 wherein $R_3$ is formyl, alkylcarbonyl, alkylcarbonyl monosubstituted by halo, cyano, acetyl, alkoxy or phenyl, alkoxycarbonyl, alkoxycarbonyl monosubstituted by halo or phenyl, benzoyl or phenoxycarbonyl.

5. A compound according to claim 1 having the formula

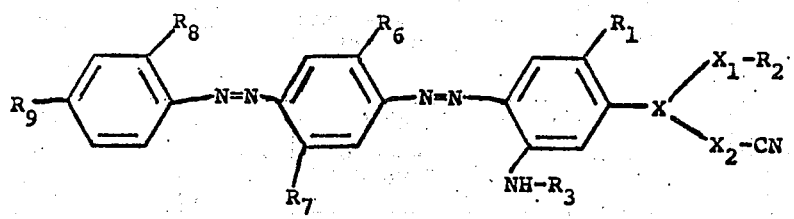

wherein $R_1$ is hydrogen, alkyl or alkoxy, $R_2$ is alkylcarbonyloxy, alkylcarbonyloxy monosubstituted by halo, cyano, acetyl, alkoxy, phenyl or phenoxy, benzoyloxy, benzoyloxy monosubstituted by halo, alkyl or nitro, alkoxycarbonyloxy or alkoxycarbonyloxy monosubstituted by halo or phenyl, $R_3$ is formyl, alkylcarbonyl, alkylcarbonyl monosubstituted by halo, cyano, acetyl, alkoxy or phenyl, dihaloalkylcarbonyl, alkoxycarbonyl, alkoxycarbonyl monosubstituted by halo or phenyl, benzoyl or phenoxycarbonyl, $R_6$ is hydrogen, alkoxy or halo, $R_7$ is hydrogen, alkyl, alkoxy or halo, $R_8$ is hydrogen or halo, and $R_9$ is hydrogen, halo, hydroxy, nitro, cyano, thiocyano, methylsulfonyl, alkyl, alkoxy, alkylcarbonyl or alkoxycarbonyl, and each of $X_1$ and $X_2$ is independently straight or branched chain alkylene of 1 to 6 carbon atoms, wherein each halo is independently chloro or bromo, and each alkyl, alkoxy, alkyl chain of alkylcarbonyl, dihaloalkylcarbonyl and alkylcarbonyloxy and alkoxy chain of alkoxycarbonyl and alkoxycarbonyloxy independently has 1 to 4 carbon atoms.

6. A compound according to claim 5 wherein $R_6$ is hydrogen, methoxy or chloro, $R_7$ is hydrogen, methyl, methoxy or chloro, $R_8$ is hydrogen or chloro, $R_9$ is hydrogen, halo, hydroxy, nitro, cyano, thiocyano, methylsulfonyl, methyl, methoxy, ethoxy, acetyl or methoxycarbonyl, and each of $X_1$ and $X_2$ is independently —CH$_2$—CH$_2$— or

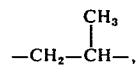

wherein each alkyl, alkoxy, alkyl chain of alkylcarbonyl, dihaloalkylcarbonyl and alkylcarbonyloxy and alkoxy chain of alkoxycarbonyl and alkoxycarbonyloxy independently has 1 or 2 carbon atoms.

7. A compound according to claim 6 wherein $R_1$ is hydrogen, $R_2$ is alkylcarbonyloxy or alkoxycarbonyloxy, $R_3$ is alkylcarbonyl or alkoxycarbonyl, $R_6$ is hydrogen, $R_7$ is hydrogen, $R_8$ is hydrogen, $R_9$ is hydrogen, $X_1$ is —CH$_2$CH$_2$—, and $X_2$ is —CH$_2$CH$_2$—.

8. A compound of the formula

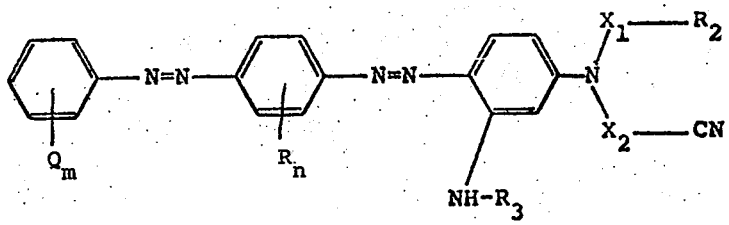

wherein each Q is independently halo, hydroxy, nitro, cyano, thiocyano, methylsulfonyl, alkyl, alkoxy, alkylcarbonyl or alkoxycarbonyl, each R is independently halo, hydroxy, nitro, cyano, thiocyano, methylsulfonyl, alkyl, alkoxy, alkylcarbonyl or alkoxycarbonyl, $R_2$ is alkylcarbonyloxy, alkylcarbonyloxy monosubstituted by halo, alkoxy, alkylcarbonyl, phenyl or phenoxy or alkoxycarbonyloxy, $R_3$ is alkylcarbonyl, alkylcarbonyl monosubstituted by halo, cyano, alkoxy or alkylcarbonyl, dihaloalkylcarbonyl, alkoxycarbonyl or alkoxycarbonyl monosubstituted by halo or alkoxy, each of $X_1$ and $X_2$ is —CH$_2$CH$_2$—, $m$ is 0, 1 or 2, and $n$ is 0, 1 or 2, wherein each halo is independently chloro or bromo, and each alkyl, alkoxy, alkyl chain of alkylcarbonyl, dihaloalkylcarbonyl and alkylcarbonyloxy and alkoxy chain of alkoxycarbonyl and alkoxycarbonyloxy independently has 1 to 4 carbon atoms.

9. The compound according to claim 6 having the formula

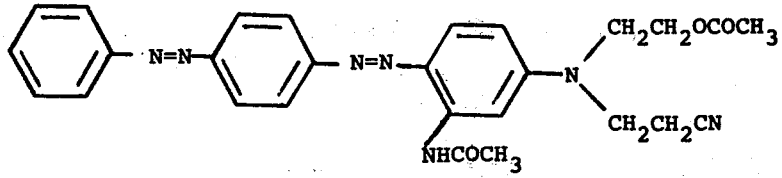

10. The compound according to claim 6 having the formula

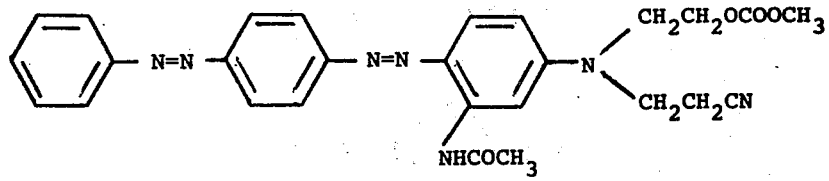

11. The compound according to claim 6 having the formula

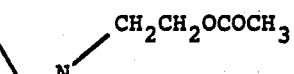
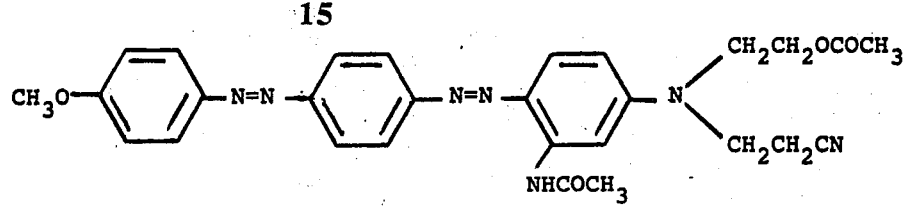
12. The compound according to claim 6 having the formula
15. The compound according to claim 6 having the formula
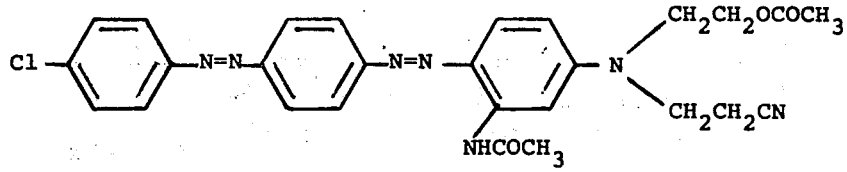
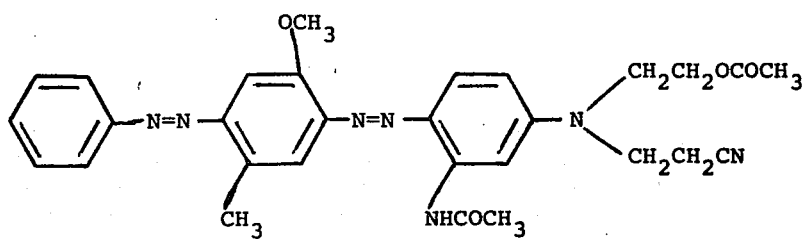
13. The compound according to claim 6 having the formula
16. The compound according to claim 6 having the formula
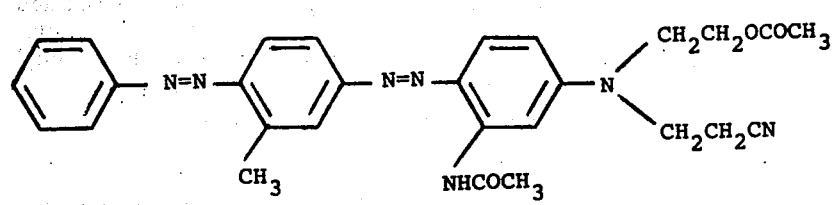
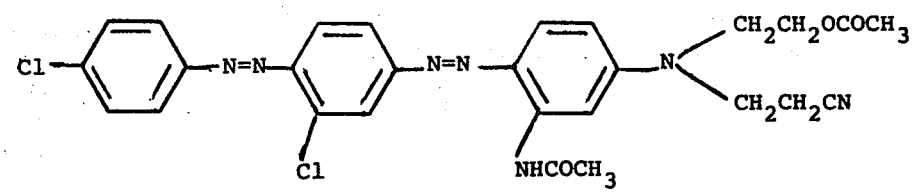
14. The compound according to claim 6 having the formula
17. The compound according to claim 6 having the formula
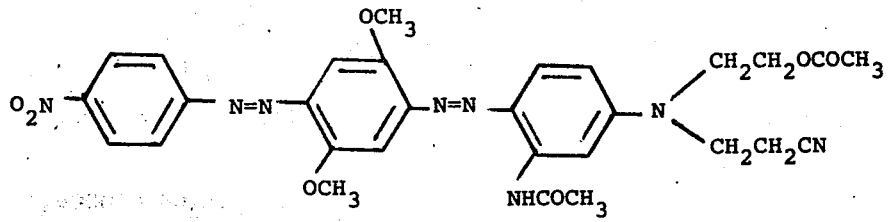
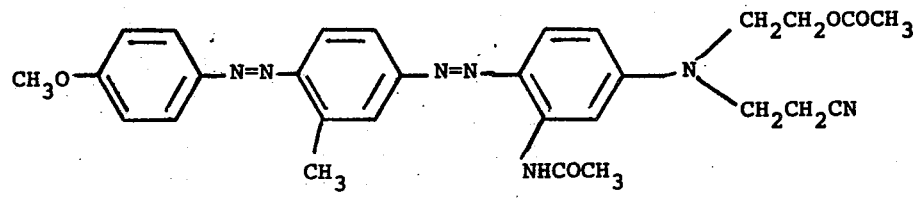

18. The compound according to claim 6 having the formula

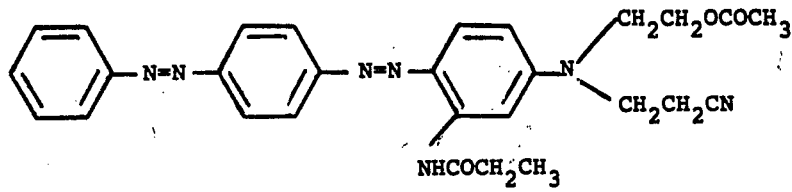

19. The compound according to claim 6 having the formula

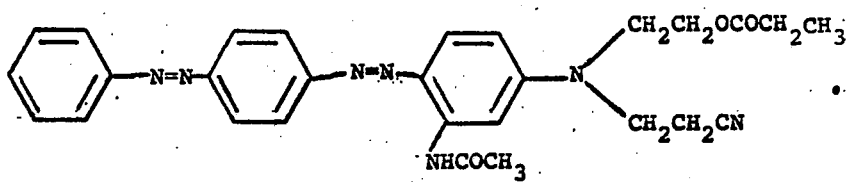

20. The compound according to claim 6 having the formula

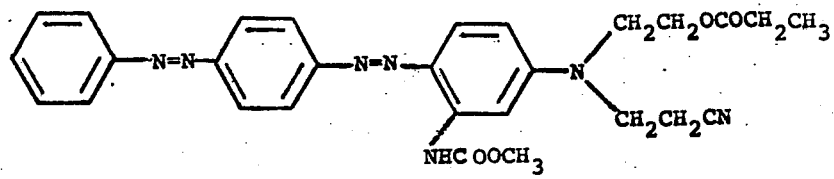

21. The compound according to claim 6 having the formula

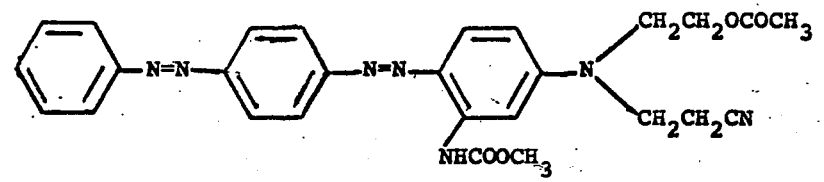

22. The compound according to claim 6 having the formula

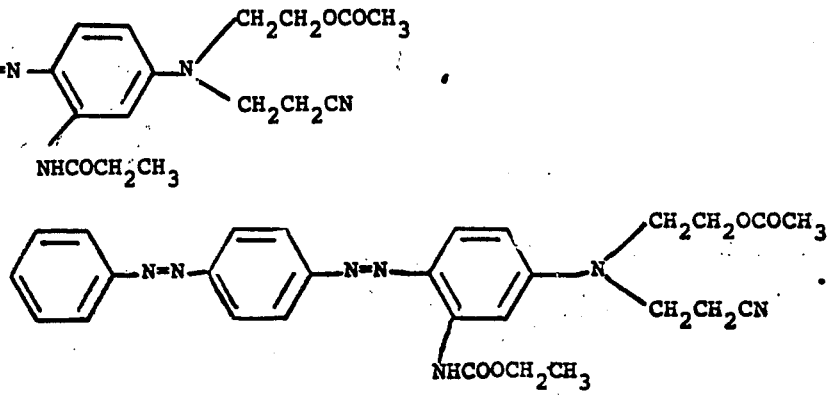

23. The compound according to claim 6 having the formula

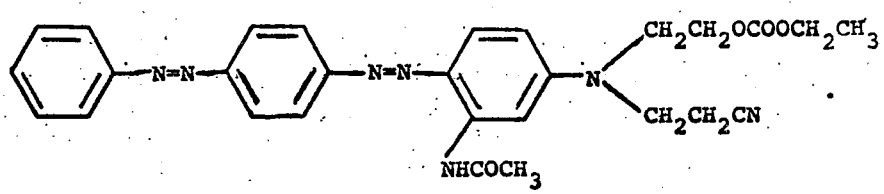

24. The compound according to claim 6 having the formula

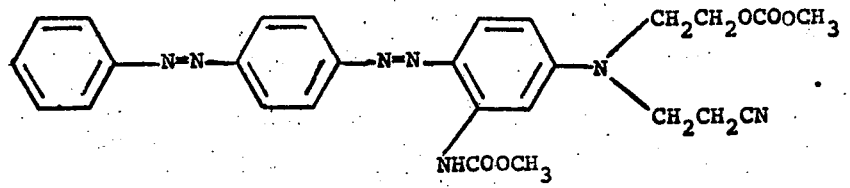

25. The compound according to claim 6 having the formula

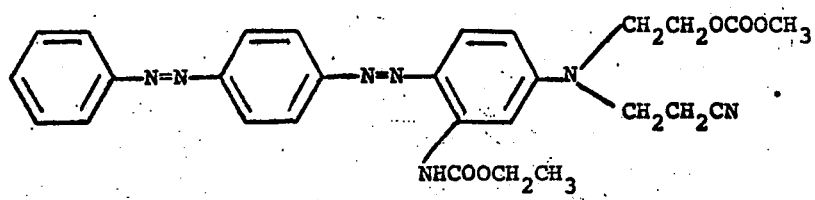

* * * * *